United States Patent
Takechi et al.

(10) Patent No.: US 11,133,523 B2
(45) Date of Patent: Sep. 28, 2021

(54) AQUEOUS ELECTROLYTES WITH PROTONIC IONIC LIQUID AND BATTERIES USING THE ELECTROLYTE

(71) Applicant: TOYOTA MOTOR ENGINEERING & MANUFACTURING NORTH AMERICA, INC., Erlanger, KY (US)

(72) Inventors: Kensuke Takechi, Ann Arbor, MI (US); Ruidong Yang, Ann Arbor, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 139 days.

(21) Appl. No.: 15/663,262

(22) Filed: Jul. 28, 2017

(65) Prior Publication Data
US 2019/0036151 A1  Jan. 31, 2019

(51) Int. Cl.
*H01M 10/0525* (2010.01)
*H01M 10/0563* (2010.01)
*H01M 10/0566* (2010.01)
*H01M 10/36* (2010.01)

(52) U.S. Cl.
CPC ... *H01M 10/0525* (2013.01); *H01M 10/0563* (2013.01); *H01M 10/0566* (2013.01); *H01M 10/36* (2013.01); *H01M 2220/20* (2013.01); *H01M 2300/0002* (2013.01); *H01M 2300/0008* (2013.01); *H01M 2300/0011* (2013.01); *H01M 2300/0014* (2013.01)

(58) Field of Classification Search
CPC ..... H01M 2300/0002; H01M 10/0525; H01M 10/0563; H01M 10/0566; H01M 10/0567; H01M 10/0569
See application file for complete search history.

(56) References Cited

U.S. PATENT DOCUMENTS

| | | | |
|---|---|---|---|
| 2011/0189544 A1* | 8/2011 | Kim ............ | H01M 4/485 429/231.1 |
| 2013/0095388 A1* | 4/2013 | Nakamoto ..... | H01M 4/13 429/304 |
| 2014/0234732 A1* | 8/2014 | Park ............ | H01M 4/134 429/405 |
| 2014/0287640 A1* | 9/2014 | Hariprakasha ... | C07F 9/5407 442/140 |
| 2017/0373351 A1* | 12/2017 | Kawai .......... | H01G 11/32 |

(Continued)

OTHER PUBLICATIONS

Menne et al; "Protic ionic liquids as electrolytes for lithium-ion batteries"; Electrochemistry Communications; vol. 31, Jun. 2013, pp. 39-41 (Year: 2013).*

(Continued)

*Primary Examiner* — Nathanael T Zemui
(74) *Attorney, Agent, or Firm* — Oblon, McClelland, Maier & Neustadt, L.L.P.

(57) ABSTRACT

An aqueous electrolyte composition suitable for a lithium ion battery is provided. The aqueous electrolyte composition contains water, an ionic liquid which is a salt of a protonic cation and an anion comprising a fluoroalkylsulfonyl group and a lithium fluoroalkylsulfonyl salt. A lithium ion battery containing the aqueous electrolyte and a vehicle at least partially powered by the battery are also provided.

14 Claims, 8 Drawing Sheets

(56) References Cited

U.S. PATENT DOCUMENTS

2019/0148754 A1* 5/2019 Floner .................. H01M 8/20
429/499

OTHER PUBLICATIONS

Anouti et.al, "Synthesis and Characterization of New Pyrrolidinium Based Protic Ionic Liquids Good and Superionic Liquids", 2008 (Year: 2008).*

Vogl et. al; "The beneficial effect of protic ionic liquids on the lithium environment in electrolytes for battery applications"; Published: Mar. 13, 2014 (Year: 2014).*

* cited by examiner

AQUEOUS ELECTROLYTES WITH PROTONIC IONIC LIQUID AND BATTERIES USING THE ELECTROLYTE

BACKGROUND

Field of the Disclosure

This disclosure is directed an aqueous electrolyte composition suitable for use in high energy batteries, including lithium ion secondary batteries, which provides a wide electrochemical window of performance and increased safety and convenience in vehicle construction.

Discussion of the Background

A demand of intrinsically safe high-energy batteries is now urgent because of the rapid development and commercialization of electrified vehicles such as EV, PHV and HV. Since the current Li-ion secondary battery contains a flammable non-aqueous electrolyte, it is necessary to install external battery control circuits and internal safety components in the vehicle. On the other hand, batteries using aqueous (water-based) electrolyte, such as Ni-MH battery, are much safer than those batteries because of the inflammable property of the electrolyte, however, the energy density of batteries with aqueous electrolytes is quite low due to a low voltage profile resulting from the limited electrochemical stability of the aqueous electrolyte. In conventional aqueous electrolytes, the electrochemical stability (electrochemical window) determined by the decomposition voltage of the water is usually less than 2 V.

Thus, aqueous electrolyte batteries known to date do not provide the energy density necessary to compete with or replace current Li-ion batteries, because the electrochemical stability of the aqueous electrolyte has such a low voltage profile. One effort to widen the electrochemical window by suppression of the decomposition has included preparing a highly concentrated aqueous electrolyte composition and such systems may perform with an electrochemical window as wide as about 3 V. In one system for a lithium-ion battery electrolyte the composition contains a high concentration of a Li-salt (21 m) which is believed to stabilize the water by formation of a complex between the salt and the water molecule. Since the window of the free-water (bulk water, regular water), which has clusters of water molecules, is different from the window of individual water molecules, the water molecules coordinated by highly concentrated salt ions can behave like the "individual water molecules" to have wider electrochemical window.

However, the limit of the reduction (negative) voltage of the window of such systems is about 1.8 V (vs Li/Li+) and this value of reducing voltage limits the candidates suitable for utility as anode materials. For example, one anode material presently of high interest, lithium titanium oxide ($Li_4Ti_5O_{12}$) (LTO), would not be suitable in such a battery system because the redox potential of LTO is about 1.5 V.

Accordingly, one object of the present invention is to provide an aqueous electrolyte composition having an electrochemical window sufficiently wide to be compatible and functional in a secondary battery having anode and cathode materials which provide high energy density.

Another object of the present invention is to provide an aqueous electrolyte system for a lithium-ion secondary battery having an electrochemical window sufficiently wide to be compatible and functional in a secondary battery having anode and cathode materials which provide high energy density.

A further object of the invention is to provide a lithium ion secondary battery having an aqueous electrolyte which has an energy density equal to or greater than present conventional lithium-ion batteries.

SUMMARY OF THE DISCLOSURE

These and other objects have been achieved by the present disclosure, the first embodiment of which includes an aqueous electrolyte for a lithium-ion secondary battery comprising:
water;
a lithium salt of ion comprising a fluoroalkylsulfonyl group of formula (I):

$$R-SO_2- \qquad (I)$$

wherein R is a perfluoroalkyl group of 1-5 carbons; and
an ionic liquid which is a salt of a protonic cation and an anion comprising a fluoroalkylsulfonyl group of formula (I).

In an aspect of the first embodiment, the protonic cation of the ionic liquid comprises at least one structure selected from the group consisting of an ammonium cation having a N—H component, a phosphonium cation having at least one P—H component, an ammonium cation comprising a —OH group and a phosphonium cation comprising a —OH group.

In another aspect of the first embodiment the anion comprising a fluoroalkylsulfonyl group of formula (I) is at least one anion selected from the group consisting of bis(trifluoromethyl-sulfonyl)imide (TFSI), bis(pentafluoroethyl-sulfonyl)imide (BETI), bis(fluoromethylsulfonyl)imide (FSI) and trifluoromethylsulfonate (TFS).

In a second embodiment the present disclosure includes a lithium ion battery comprising: an anode capable of intercalation and de-intercalation of lithium ions; a cathode capable of intercalation and de-intercalation lithium ions; and an aqueous electrolyte in contact with the anode and cathode which comprises: water; a lithium salt of an anion comprising a fluoroalkylsulfonyl group of formula (I):

$$R-SO2- \qquad (I)$$

wherein R is a perfluoroalkyl group of 1-5 carbons; and an ionic liquid which is a salt of a protonic cation and an anion comprising a fluoroalkylsulfonyl group of formula (I).

In an aspect of the second embodiment the anode capable of intercalation and de-intercalation of lithium ions is stable to water and has a redox potential greater than 0.5 V vs Li/Li$^+$.

In a further aspect of the second embodiment the cathode capable of intercalation and de-intercalation lithium ions comprises at least one compound selected from the group consisting of $LiMn_2O_4$, $LiCoO_2$, $LiFe_2(PO_4)$, $LiMn_{1/3}Ni_{1/3}Co_{1/3}O_2$, $LiNi_{0.5}Mn_{1.5}O_4$ and $LiCoPO_4$.

In a third embodiment a vehicle having a battery of the second embodiment is provided.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Figure 1:
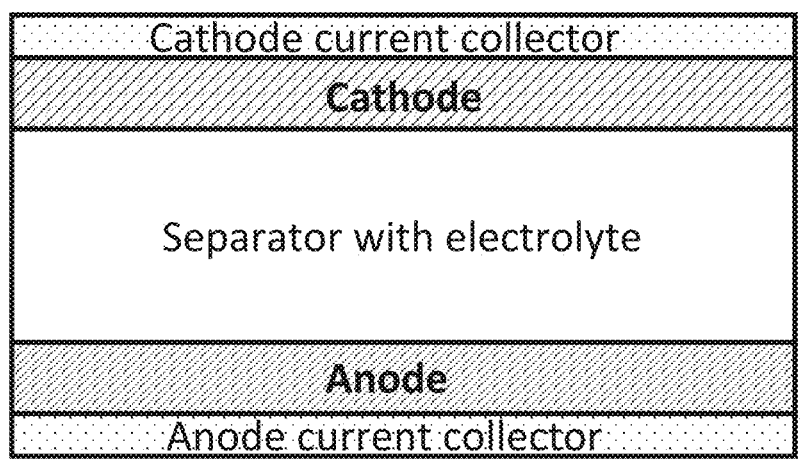
FIG. 1 shows a battery cell configuration employed for evaluation of the electrolyte systems of the Examples.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. Where % composition description is provided the % values are % by weight unless specified otherwise. As used herein, the term "vehicle" refers to any power driven device designed for transportation including an automobile, truck van, bus, golf cart and other utility forms of transportation.

In ongoing investigation to further widen the electrochemical window and safety of lithium-ion batteries, the inventors are conducting extensive studies of aqueous electrolyte systems and methods to widen the electrochemical window thereof in U.S. application Ser. No. 15/252,513, filed Aug. 31, 2016, the present inventors disclosed that the water component of an electrolyte system may be strongly stabilized in a composition containing a chemical component in addition to a concentrated salt. Explicitly, it was described that a highly stabilized electrolyte system for a lithium-ion battery having a wide electrochemical window may be obtained by including a lithium salt of an anion having a fluoroalkylsulfonyl group and linear or cyclic ether in the aqueous composition.

In ongoing studies of such aqueous electrolyte systems the inventors have surprisingly discovered that a lithium ion electrolyte system may be extensively stabilized and the electrochemical window broadened when provided in a defined composition containing an ionic liquid having certain specific structural and chemical properties as described herein.

Thus, in a first embodiment, an aqueous electrolyte for a lithium-ion secondary battery comprising: water; a lithium salt of an anion comprising a fluoroalkylsulfonyl group of formula (I):

$$R—SO_2— \qquad (I)$$

wherein R is a perfluoroalkyl group of 1-5 carbons; and an ionic liquid which is a salt of a protonic cation and an anion comprising a fluoroalkylsulfonyl group of formula (I) is provided.

Not wishing to be bound by theory, the inventors believe that the fluoroalkylsulfonyl (R—SO2-) group wherein R is a perfluoroalkyl group of 1-5 carbons provides flexibility in the molecular structure of the anion which serves to interact with and stabilize a water molecule. Nonlimiting examples of suitable lithium salts include lithium bis(trifluoromethylsulfonyl)imide (LiTFTSI), lithium bis(pentafluoroethylsulfonyl)imide (LiBETI), lithium bis(fluoromethylsulfonyl) imide (LiFSI) and lithium trifluoromethylsulfonate (LiTFS).

The inventors have discovered that water stabilization is significantly enhanced when an ionic liquid having a protonic cation and an anion having the fluoroalkylsulfonyl group of formula (I) is included. Anions having a fluoroalkylsulfonyl group of formula (I) according to the first embodiment include but are not limited to bis(trifluoro ethyl-sulfo)imide (TFSI), bis(pentafluoroethyl-sulfonyl) imide (BETI), bis(fluoromethylsulfonyl)imide (FSI) and trifluoromethylsulfonate (TFS).

Unexpectedly an appropriate addition of protonic ionic liquid may stabilize the water more strongly due to enhanced hydrogen bonding originated by its active proton moiety. A much wider electrochemical window may be obtained which allows for utilization of Lithium Nickel Manganese Oxide (Li Ni0.5Mn1.5 O4, "LMNO") as well as LTO or other conventional Li$^+$ anode materials). Importantly, the electrolyte liquids of this first embodiment may have good fluidity and good conductivity.

The protonic cation of the ionic liquid comprises at least one molecular configuration selected from the group consisting of an ammonium cation having a N—H component, a phosphonium cation having at least one P—H component, an ammonium cation comprising a —OH group and a phosphonium cation comprising a —OH group. Again, not wishing to be bound by theory, the inventors believe that the presence of the structures listed here enhance interaction with water molecules through formation of hydrogen bonds and thus serve to stabilize the water to electrochemical reaction.

Examples of suitable protonic cations may include but are not limited to cations of the following structures:

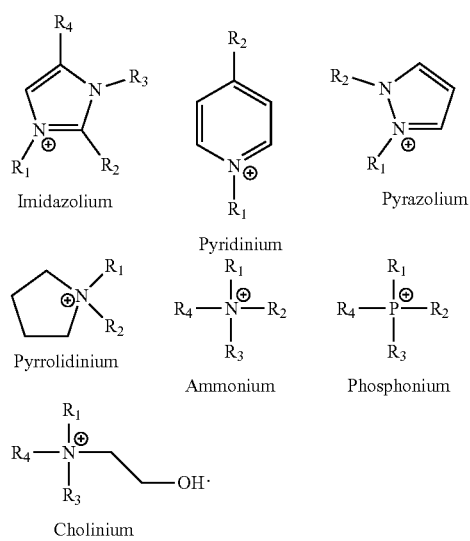

wherein with the exception of the cholinium cation, which contains a —OH group, at least one of $R_1$, $R_2$ and $R_3$ when bonded to N or P is an —H. When not a —H, $R_{1-4}$ are each independently an alkyl group having 1-6 carbons, being linear branched or cyclic.

Suitable anions of the protonic ionic liquid are the same as those listed above for the lithium salt.

The inventors have determined that in order to obtain an electrolyte composition with sufficiently stabilized water to prepare an aqueous lithium ion battery, the electrolyte composition may have a relative mole relationship of lithium salt of the anion comprising a fluoroalkylsulfonyl group of formula (I), water and the ionic liquid such that for 1 mole of the lithium salt, there are 0.1 to 20 mole of ionic liquid and 0.1 to 10 mole of water, preferably such that for 1 mole of the lithium salt, there are 1 to 10 mole of ionic liquid and 0.5 to 5 mole of water and more preferably such that for 1 mole of the lithium salt, there are 1 to 5 mole of ionic liquid and 1 to 5 mole of water.

The lithium salt of an anion comprising a fluoroalkylsulfonyl group of formula (I) may be present in the electrolyte at a concentration of from 2 M to 20 M, preferably from 2 M to 15 M and most preferably from 2 M to 10 M.

In a second embodiment an aqueous lithium ion battery is provided. The battery comprises: an anode capable of intercalation and de-intercalation of lithium ions; a cathode capable of intercalation and de-intercalation lithium ions; and an aqueous electrolyte in contact with the anode and cathode which comprises: water, a lithium salt of an anion comprising a fluoroalkylsulfonyl group of formula (I):

$$R-SO_2- \quad (I)$$

wherein R is a perfluoroalkyl group of 1-5 carbons; and an ionic liquid which is a salt of a protonic cation and an anion comprising a fluoroalkylsulfonyl group of formula (I).

According to the second embodiment the lithium salt of an anion comprising a fluoroalkylsulfonyl group of formula (I) of the aqueous electrolyte is at least one salt selected from the group consisting of lithium bis(trifluoromethyl-sulfonyl)imide (LiTFSI), lithium bis(pentafluoroethyl-sulfonyl)imide (LiBETI), lithium bis(fluoromethylsulfonyl)imide (LiFSI) and lithium trifluoromethylsulfonate (LiTFS).

In an aspect of the second embodiment the protonic cation of the electrolyte ionic liquid comprises at least one selected from the group consisting of an ammonium cation having a N—H component, a phosphonium cation having at least one P—H component, an ammonium cation comprising a —OH group and a phosphonium cation comprising a —OH group. Further to this aspect the protonic cation may be one or more selected from the group of cations of the following formulae:

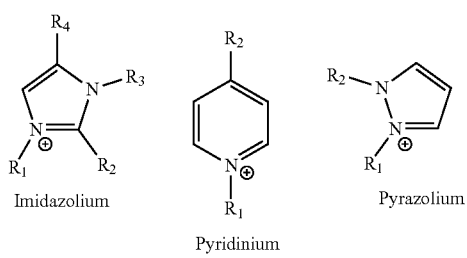

Imidazolium  Pyridinium  Pyrazolium

-continued

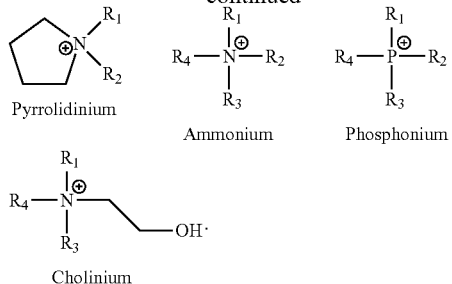

Pyrrolidinium  Ammonium  Phosphonium

Cholinium

In a further aspect the ionic liquid is a salt of at least one protonic cation selected from the group consisting of the following formulae:

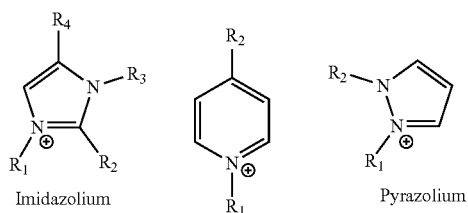

Imidazolium  Pyridinium  Pyrazolium

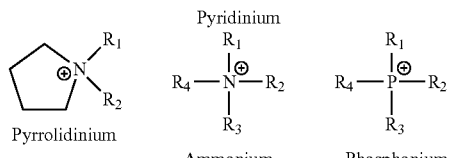

Pyrrolidinium  Ammonium  Phosphonium

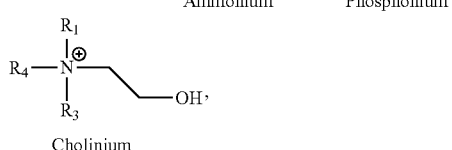

Cholinium and at least one anion comprising a fluoroalkylsulfonyl group of formula (I) selected from the group consisting of bis (trifluoromethyl-sulfonyl)imide (TFSI), bis(pentafluoroethyl-sulfonyl)imide (BETI), bis(fluoromethylsulfonyl)imide (FSI) and trifluoromethylsulfonate (TFS).

In one further aspect of the second embodiment, a mole ratio relationship of the lithium salt of an anion comprising a fluoroalkylsulfonyl group of formula (I), water and ionic liquid is such that for 1 mole of the lithium salt, there are 0.1 to 20 mole of ionic liquid and 0.1 to 10 mole water.

According to the second embodiment the lithium salt of an anion comprising a fluoroalkylsulfonyl group of formula (I) may be present in the electrolyte at a concentration of from 2 M to 20 M, preferably from 2 M to 15 M and most preferably from 2 M to 10 M.

Aqueous rechargeable lithium ion batteries (ARLB) must contain electrodes stable and compatible with water. Generally, any material capable of intercalation and de-intercalation of Li ions which is stable to exposure to water under electrochemical conditions may be employed.

Suitable cathode materials which are compatible with an aqueous electrolyte and have an appropriate redox potential of less than 5.5 V vs Li/Li+ include but are not limited to: $LiMn_2O_4$, $LiCoO_2$, $LiFe_2(PO_4)$, $LiMn_{1/3}Ni_{1/3}Co_{1/3}O_2$, $LiNi_{0.5}Mn_{1.5}O_4$ and $LiCoPO_4$. Porous forms of any these may be prepared and nanoparticle structure may be especially useful as active cathode materials.

The cathode may be prepared by mixing the particles according to at least one the above materials with one or more binders and other materials conventionally employed to prepare a cathode structure for an aqueous electrolyte system. These materials may be mixed as a slurry, coated onto a metal foil, and dried. The methods of construction of a cathode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), poly vinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The cathode thus prepared may be employed in the construction of an aqueous lithium-ion battery in a conventionally known manner.

The lithium salt of an anion comprising a fluoroalkylsulfonyl group of formula (I) as listed above may be present in the electrolyte at a concentration of from 2 M to 20 M, preferably from 2 M to 15 M and most preferably from 2 M to 10 M.

With regard to the anode any kind of material suitable for utility in a Li-ion battery, which is compatible with aqueous electrolyte and has appropriate redox potential (greater than 0.5 V vs Li/Li+) may be employed. Suitable examples include, but are not limited to $Li_4Ti_5O_{12}$, elemental sulfur, $Mo_6S_8$, $Cu_2V_2O_7$, $TiS_4$, $NbS_5$ and Li terephthalate. Porous forms of any these may be prepared and nanoparticle structure may be especially useful.

The anode may be prepared by mixing the particles according to at least one the above anode materials with one or more binders and other materials conventionally employed to prepare an anode structure for an aqueous electrolyte system. These materials may be mixed as a slurry, coated onto a metal foil, and dried. The methods of construction of a anode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The battery further comprises a separator between the anode and cathode and any type of conventionally known separator compatible with an aqueous electrolyte may be employed.

The battery may be enclosed in a container and multiple units may be combined to form a battery as is conventionally known.

Preparation and charge/discharge performance evaluation of batteries according to an embodiment as shown in FIG. 1 are described in Examples 1 to 6 below. The charge discharge curves for each battery are shown in FIGS. 3 to 8 and as indicated the batteries are stable over the cycles demonstrated and have good capacity. Interestingly, the batteries having LNMO as the anode active material show high discharge voltage over 3V.

In further embodiments the present disclosure includes a vehicle containing the battery according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

Experimental

Coin cell batteries of the 2032-type shown schematically in FIG. 1 were prepared with a cathode having in an active layer of $LiMn_2O_4$ (LMO) or $LiNiMnO_2$ (LNMO) and conductive carbon with a PVdF binder. The anodes were prepared with $Li_4Ti_5O_{12}$ and conductive carbon with a PVdF binder. A Separator constructed of a Glass fiber separator was placed between the anode and cathode. The electrolyte composition for each Example is shown in the following Table. To evaluate charge/discharge performance of the battery the battery was first charged at 1.0 mA/cm$^2$ to a cut-off of 3.2 V. The battery was then discharged at 1.0 mA/cm$^2$ to a cut-off of 1.5 V at 25° C.

| Electrolyte Example | Lithium salt (molar ratio) | Ionic Liquid (molar ratio) | Water (molar ratio) |
| --- | --- | --- | --- |
| 1 | LiTFSI (1) | Choline - TFSI (1) | (1) |
| 2 | LiTFSI (1) | Choline - TFSI (1) | (2) |
| 3 | LiTFSI (0.25) | Choline - TFSI (1) | (1) |
| 4 | LiTFSI (0.5) | Choline - TFSI (1) | (1) |

Figure 2:
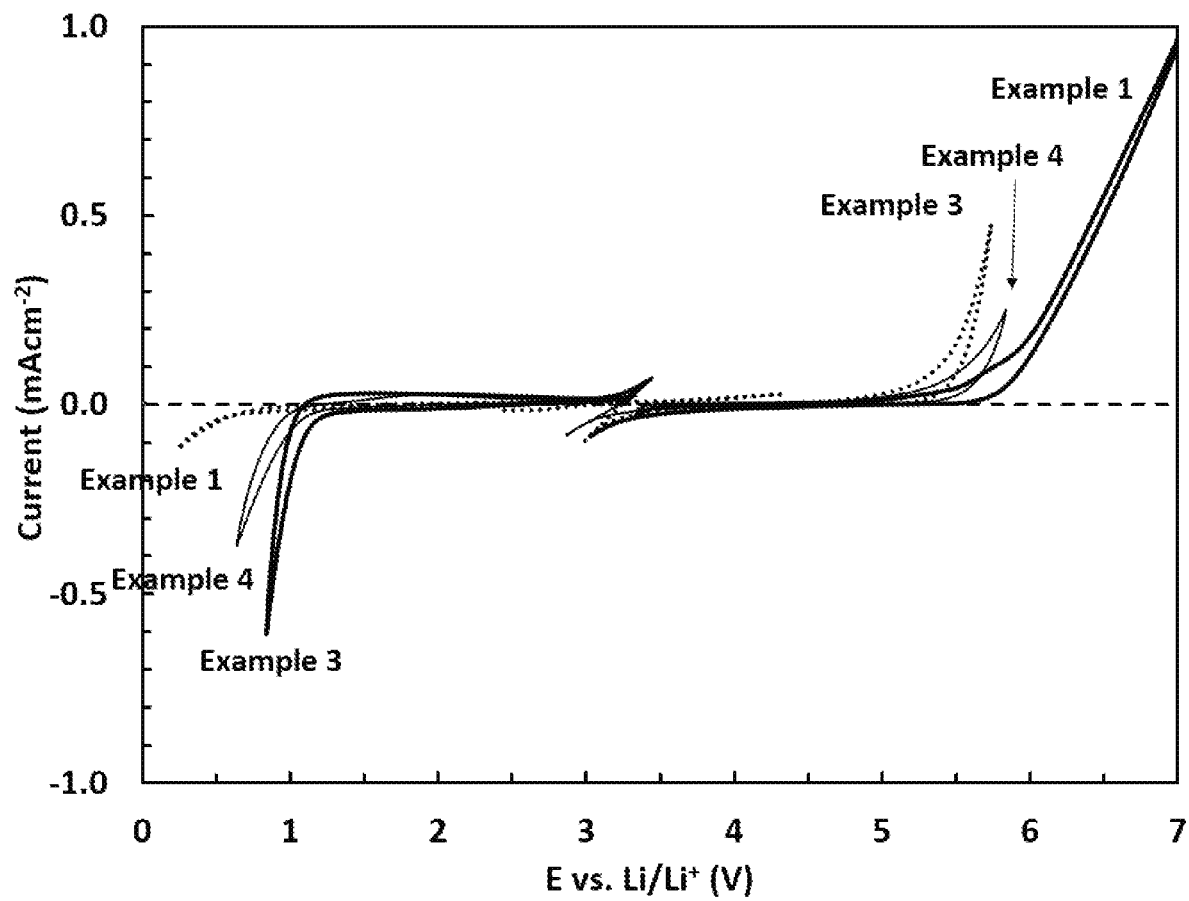
FIG. 2 shows the cyclic voltammetry curves obtained for Examples 1, 3 and 4.
Figure 3:
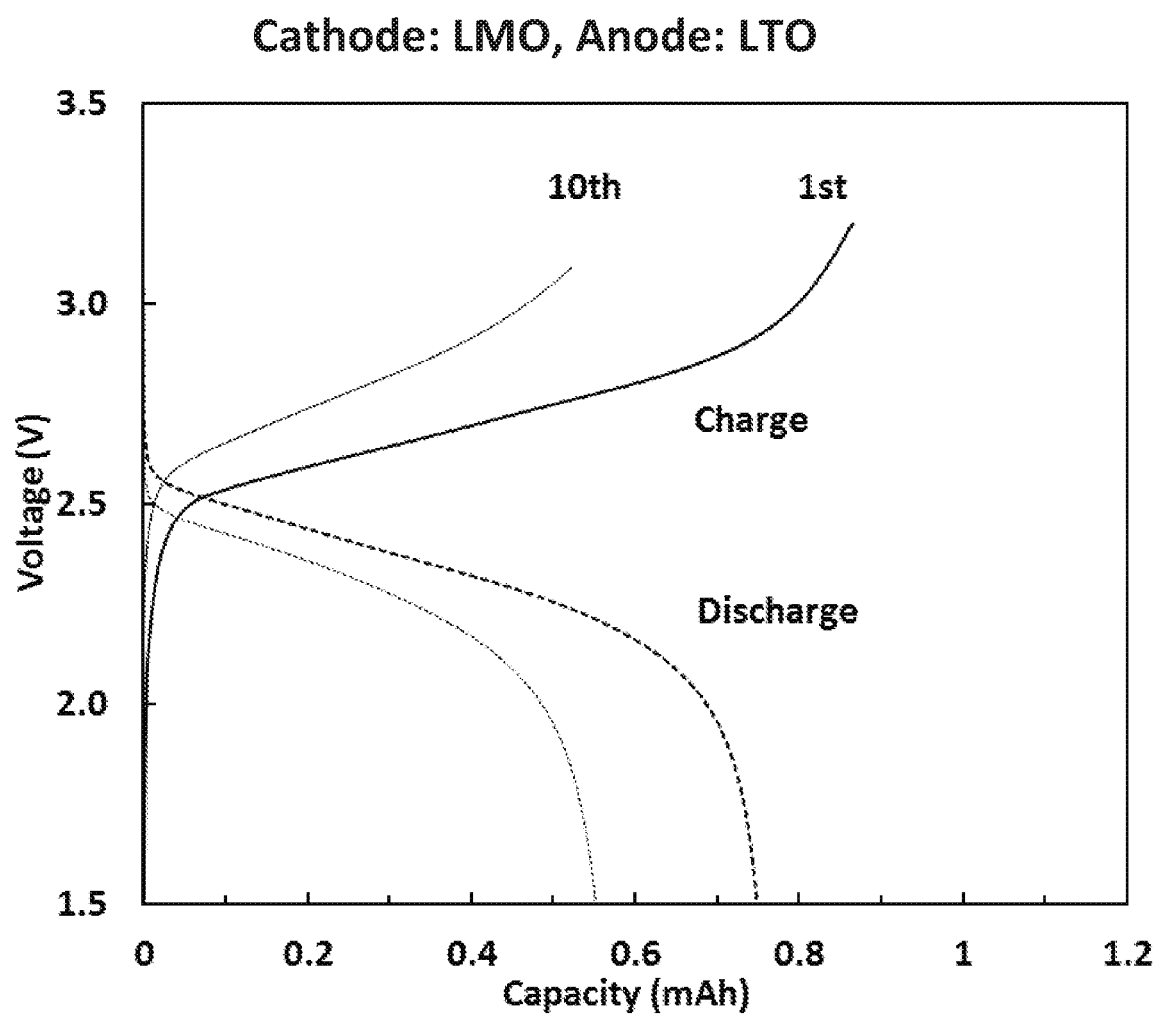
FIG. 3 shows the charge/discharge curves (1st and the 10th cycles) of a battery (LMO/LTO) with Example 1 electrolyte.
Figure 4:
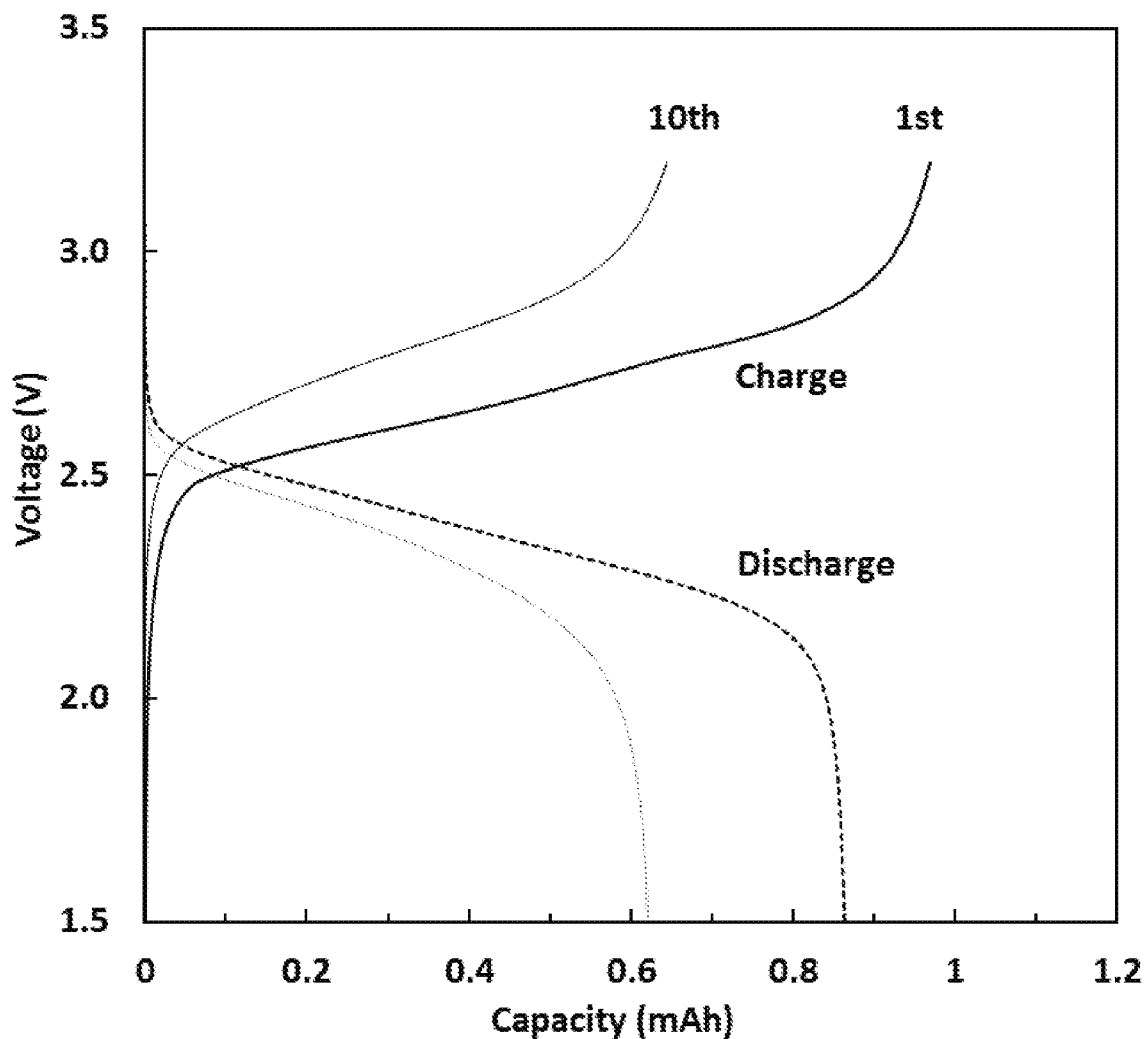
FIG. 4 shows the charge/discharge curves (1st and the 10th cycles) of a battery (LMO/LTO) with Example electrolyte 2.
Figure 5:
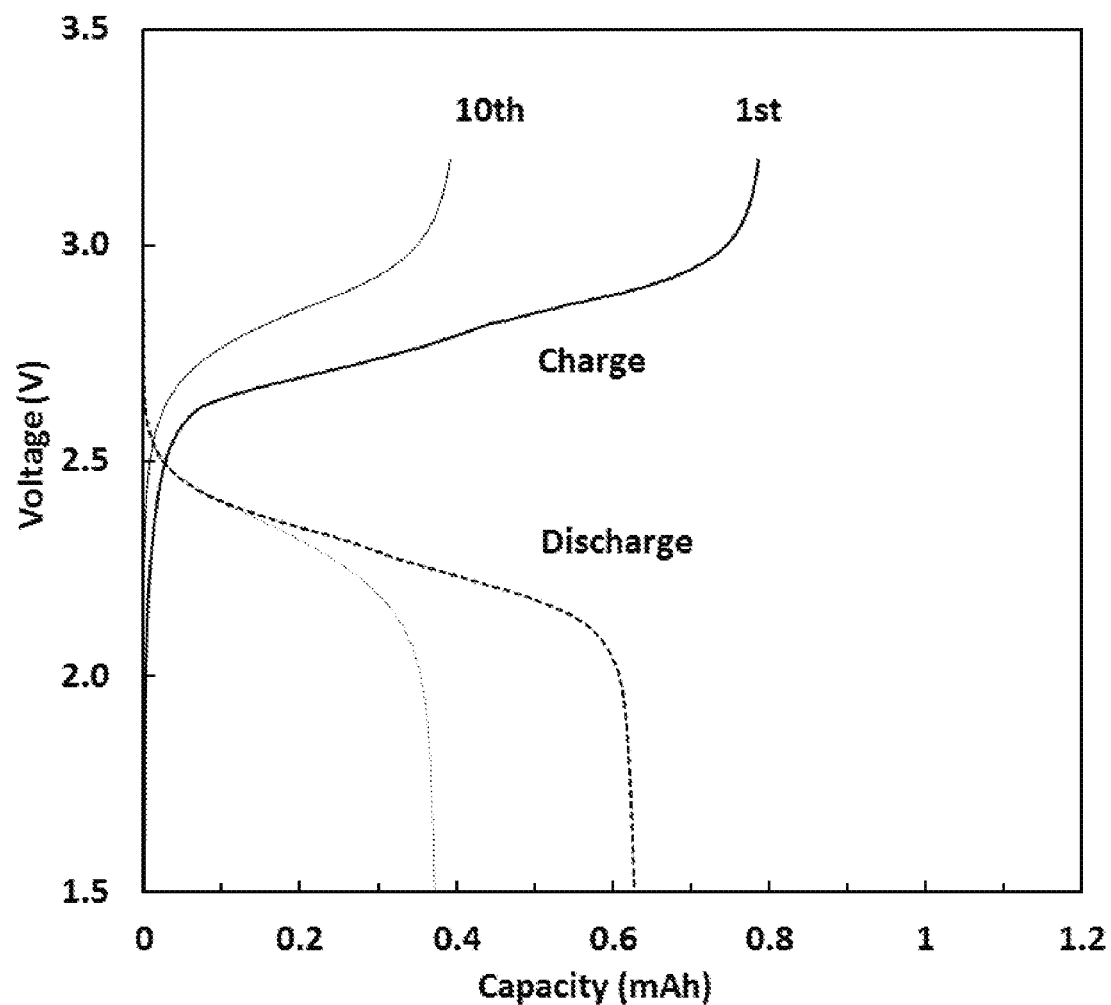
FIG. 5 shows the charge/discharge curves (1st and the 10th cycles) of a battery (LMO/LTO) with Example electrolyte 3.
Figure 6:
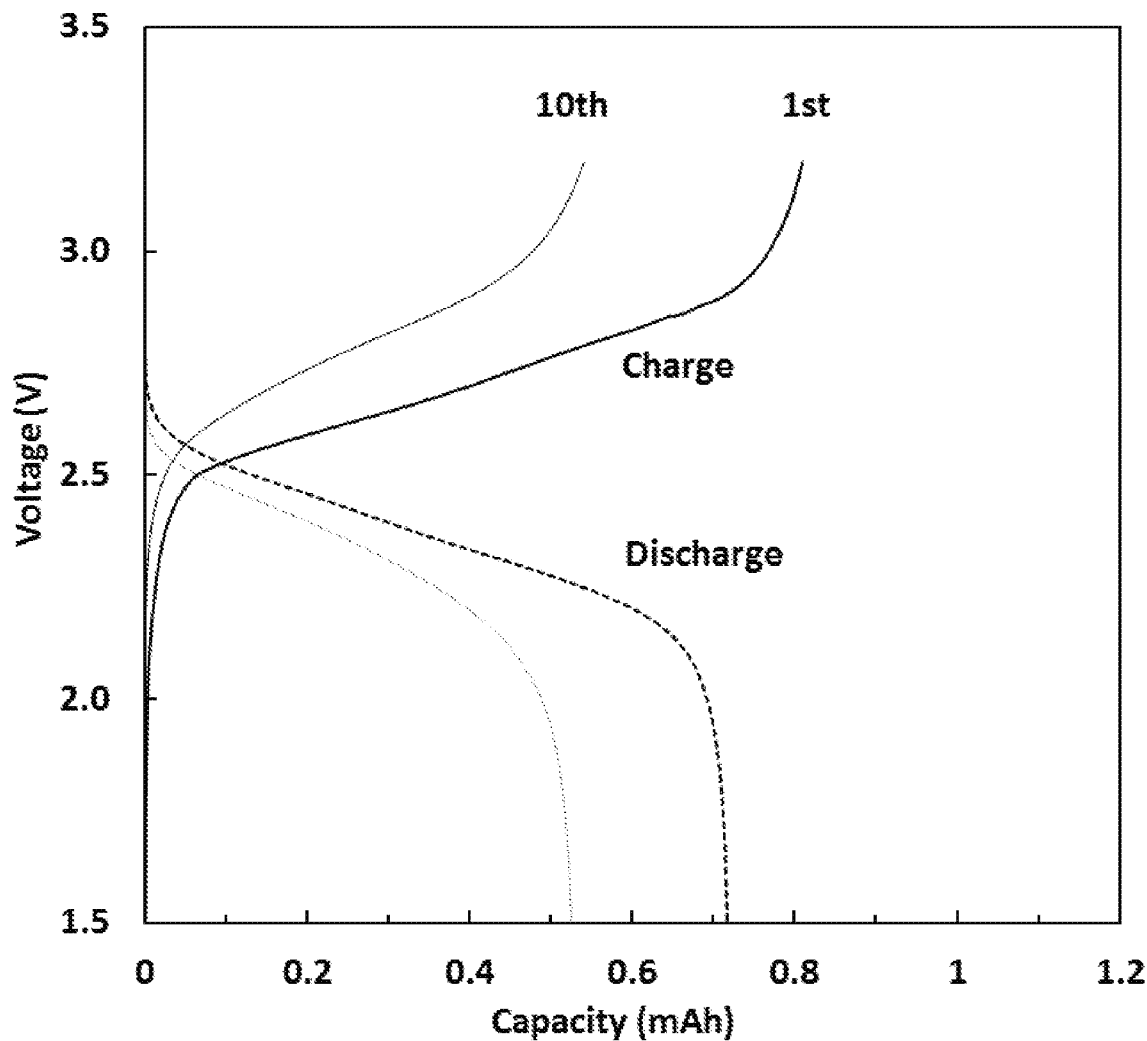
FIG. 6 shows the charge/discharge curves (1st and the 10th cycles) of a battery (LMO/LTO) with Example electrolyte 4.

FIG. 2 shows the Cyclic voltammetry analysis on Example electrolytes 1, 3 and 4. The charge/discharge curves (1$^{st}$ and the 10$^{th}$ cycles) for batteries (LMO/LTO) with Example electrolyte 1-4 are shown in FIGS. 3-6. These figures show clear evidence that the batteries according to these Examples could perform high discharge voltage over 2 V with stable cycling.

Figure 7:
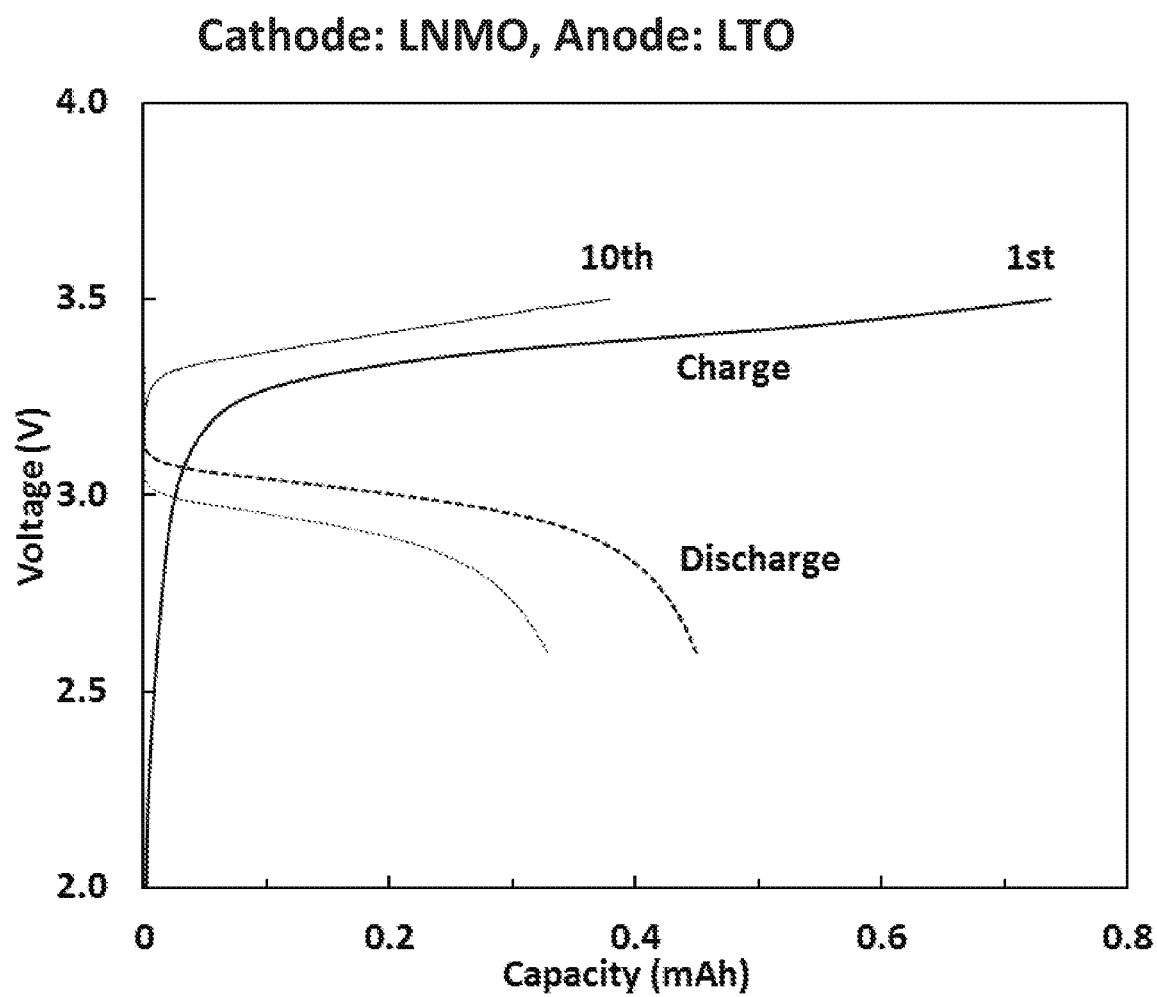
FIG. 7 shows the charge/discharge curves (1st and the 10th cycles) of a battery (LNMO/LTO) with Example electrolyte 1.
Figure 8:
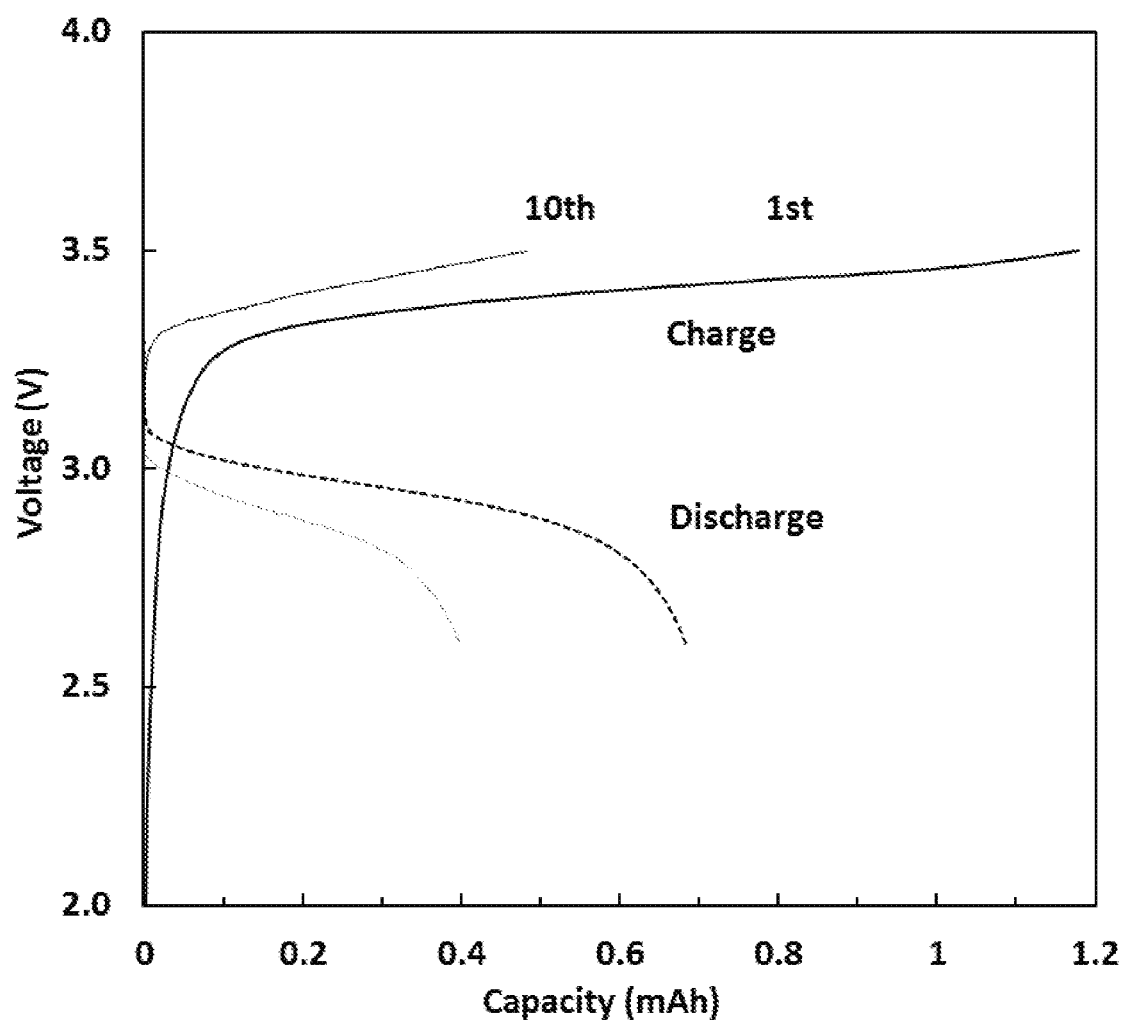
FIG. 8 shows the charge/discharge curves (1st and the 10th cycles) of a battery (LNMO/LTO) with Example electrolyte 2.

The charge/discharge curves (1$^{st}$ and the 10$^{th}$ cycles) for batteries (LMO/LTO) with Example electrolytes 1 and 2 are shown in FIGS. 7 and 8. These figures show clear evidence that the batteries according to these Examples could perform high discharge voltage over 3V with stable cycling.

The invention claimed is:

1. An aqueous electrolyte for a lithium-ion secondary battery comprising:
   water;
   a lithium salt of an anion comprising a fluoroalkylsulfonyl group of formula (I):

R—SO$_2$—      (1)

wherein R is a perfluoroalkyl group of 1-5 carbons; and
   an ionic liquid which is a salt of a protonic cation and an anion comprising a fluoroalkylsulfonyl group of formula (I) and wherein the protonic cation is selected from the group consisting of the following formulae:

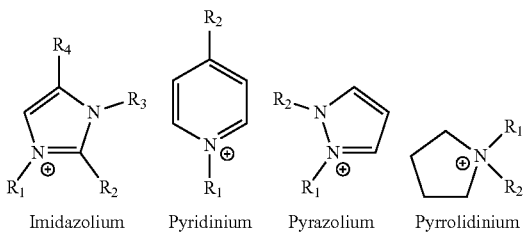

Imidazolium    Pyridinium    Pyrazolium    Pyrrolidinium wherein $R_1$ is —H, and
   $R_2$, $R_3$ and $R_4$ are each independently an alkyl group having 1-6 carbons, being linear, branched or cyclic; wherein
   the aqueous electrolyte is in contact with an anode active material capable of intercalation and de-intercalation of lithium ions.

2. The aqueous electrolyte for a lithium secondary battery of claim 1, wherein the lithium salt of an anion comprising a fluoroalkylsulfonyl group of formula (I) is at least one salt selected from the group consisting of lithium bis(trifluoromethyl-sulfonyl)imide (LiTFSI), lithium bis(pentafluoroethyl-sulfonyl)imide (LiBETI), lithium bis(fluoromethyl-sulfonyl)imide (LiFSI) and lithium trifluoromethylsulfonate (LiTFS).

3. The aqueous electrolyte for a lithium secondary battery of claim 1, wherein the protonic cation is at least one is selected from the group consisting of the following formulae:

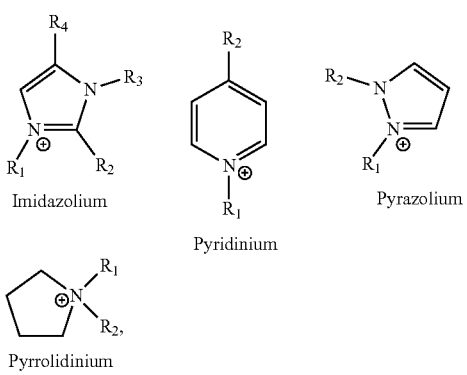

Imidazolium    Pyridinium    Pyrazolium

Pyrrolidinium and
   the anion comprising a fluoroalkylsulfonyl group of formula (I) is at least one anion selected from the group consisting of bis(trifluoromethyl-sulfonyl)imide (TFSI), bis(pentafluoroethyl-sulfonyl)imide (BETI), bis(fluoromethylsulfonyl)imide (FSI) and trifluoromethylsulfonate (TFS); wherein $R_1$ is —H, and
   $R_2$, $R_3$ and $R_4$ are each independently an alkyl group having 1-6 carbons, being linear, branched or cyclic.

4. The aqueous electrolyte for a lithium secondary battery of claim 1, wherein a mole ratio relationship of lithium salt of an anion comprising a fluoroalkylsulfonyl group of formula (I), water and ionic liquid is such that for 1 mole of the lithium salt, there are 0.1 to 20 mole of ionic liquid and 0.1 to 10 mole water.

5. The aqueous electrolyte for a lithium secondary battery of claim 1, wherein a concentration of the lithium salt of an anion comprising a fluoroalkylsulfonyl group of formula (I) is from 2 M to 20 M.

6. A lithium ion battery comprising:
   an anode having an active material capable of intercalation and de-intercalation of lithium ions wherein the active material is compatible with an aqueous electrolyte and has a redox potential greater than 0.5 V vs Li/Li$^+$;
   a cathode capable of intercalation and de-intercalation lithium ions; and
   an aqueous electrolyte in contact with the anode active material and cathode which comprises:
   water;
   a lithium salt of an anion comprising a fluoroalkylsulfonyl group of formula (I):

R—SO2-      (1)

wherein R is a perfluoroalkyl group of 1-5 carbons; and
   an ionic liquid which is a salt of a protonic cation and an anion comprising a fluoroalkylsulfonyl group of formula (I) and wherein the protonic cation comprises at least one structure selected from the group consisting of the following formulae:

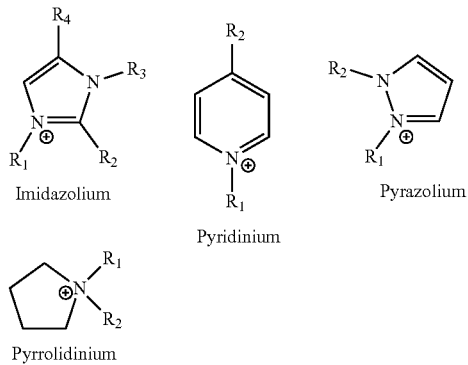

Imidazolium    Pyrazolium

Pyridinium

Pyrrolidinium wherein $R_1$ is —H, and
   $R_2$, $R_3$ and $R_4$ are each independently an alkyl group having 1-6 carbons, being linear, branched or cyclic.

7. The lithium ion battery of claim 6, wherein the lithium salt of an anion comprising a fluoroalkylsulfonyl group of formula (I) is at least one salt selected from the group consisting of lithium bis(trifluoromethyl-sulfonyl)imide (LiTFSI), lithium bis(pentafluoroethyl-sulfonyl)imide (LiBETI), lithium bis(fluoromethylsulfonyl)imide (LiFSI) and lithium trifluoromethylsulfonate (LiTFS).

8. The lithium ion battery of claim 6, wherein the protonic cation of the ionic liquid is at least one is selected from the group consisting of the following formulae:

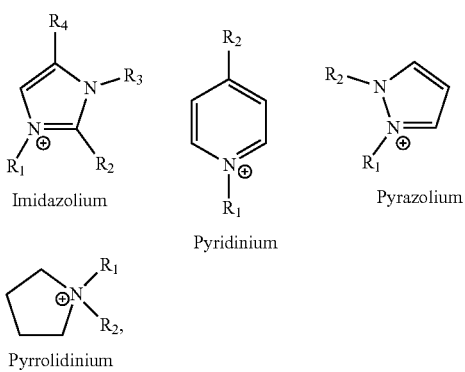

Imidazolium
Pyridinium
Pyrazolium
Pyrrolidinium and
the anion comprising a fluoroalkylsulfonyl group of formula I) of the ionic liquid is at least one anion selected from the group consisting of bis(trifluoromethyl-sulfonyl)imide (TFSI), bis(pentafluoroethyl-sulfonyl)imide (BETI), bis(fluoromethylsulfonyl)imide (FSI) and trifluoromethylsulfonate (TFS); wherein $R_1$ is —H, and $R_2$, $R_3$ and $R_4$ are each independently an alkyl group having 1-6 carbons, being linear, branched or cyclic.

9. The lithium ion battery of claim 6, wherein a mole ratio relationship of the lithium salt of an anion comprising a fluoroalkylsulfonyl group of formula (I), water and ionic liquid is such that for 1 mole of the lithium salt, there are 0.1 to 20 mole of ionic liquid and 0.1 to 10 mole water.

10. The lithium ion battery of claim 6, wherein a concentration of the lithium salt of an anion comprising a fluoroalkylsulfonyl group of formula (I) is from 2 M to 20 M.

11. The lithium ion battery of claim 6, wherein the cathode capable of intercalation and de-intercalation lithium ions comprises at least one compound selected from the group consisting of $LiMn_2O_4$, $LiCoO_2$, $LiFe_2(PO_4)$, $LiMn_{1/3}Ni_{1/3}Co_{1/3}O_2$, $LiNi_{0.5}Mn_{1.5}O_4$ and $LiCoPO_4$.

12. The lithium ion battery of claim 6, wherein the anode capable of intercalation and de-intercalation of lithium ions comprises at least one active material selected from the group consisting of $Li_4Ti_5O_{12}$, elemental Sulfur, $Mo_6S_8$, $Cu_2V_2O_7$, $TiS_4$, $NbS_5$ and Li terephthalate.

13. A vehicle, comprising the battery of claim 6.

14. The aqueous electrolyte for a lithium secondary battery of claim 1, wherein the anode capable of intercalation and de-intercalation of lithium ions comprises at least one active material selected from the group consisting of $Li_4Ti_5O_{12}$, elemental Sulfur, $Mo_6S_8$, $Cu_2V_2O_7$, $TiS_4$, $NbS_5$ and Li terephthalate.

* * * * *